Feb. 9, 1954  L. B. PAULES  2,668,464
WIRE CUTTING AND STRIPPING TOOL
Original Filed July 28, 1945  2 Sheets-Sheet 1
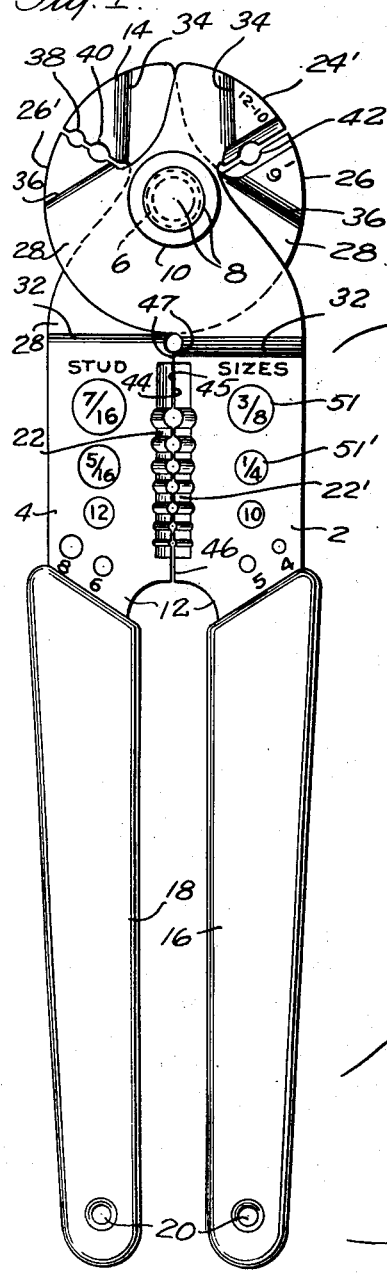
Fig. 1.
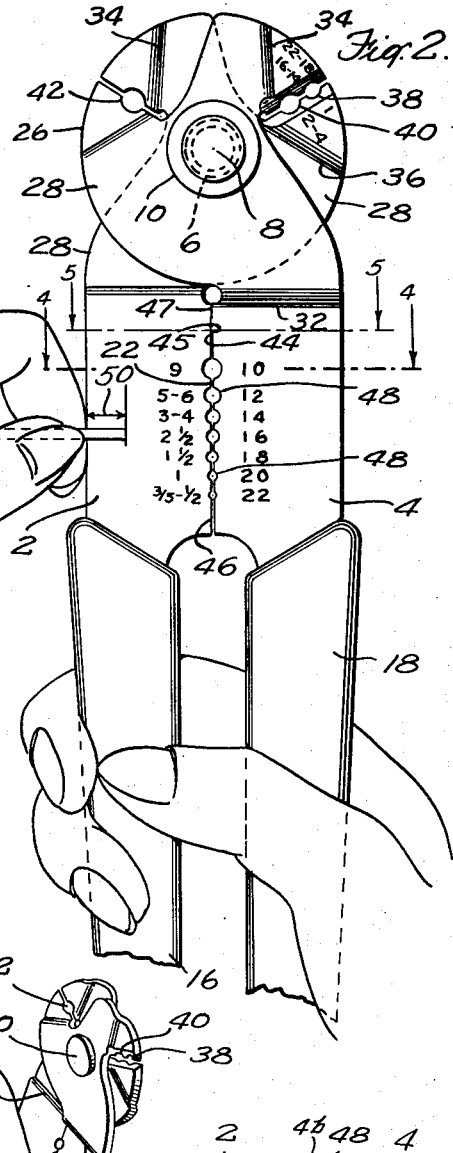
Fig. 2.
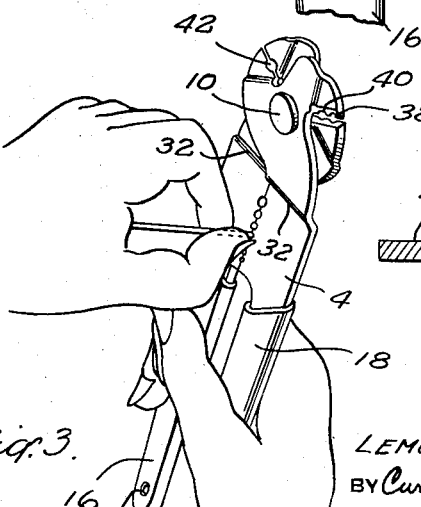
Fig. 3.
Fig. 4.
INVENTOR
LEMON B. PAULES
BY Curtis, Morris & Safford
ATTORNEYS Feb. 9, 1954 L. B. PAULES 2,668,464
WIRE CUTTING AND STRIPPING TOOL
Original Filed July 28, 1945 2 Sheets-Sheet 2
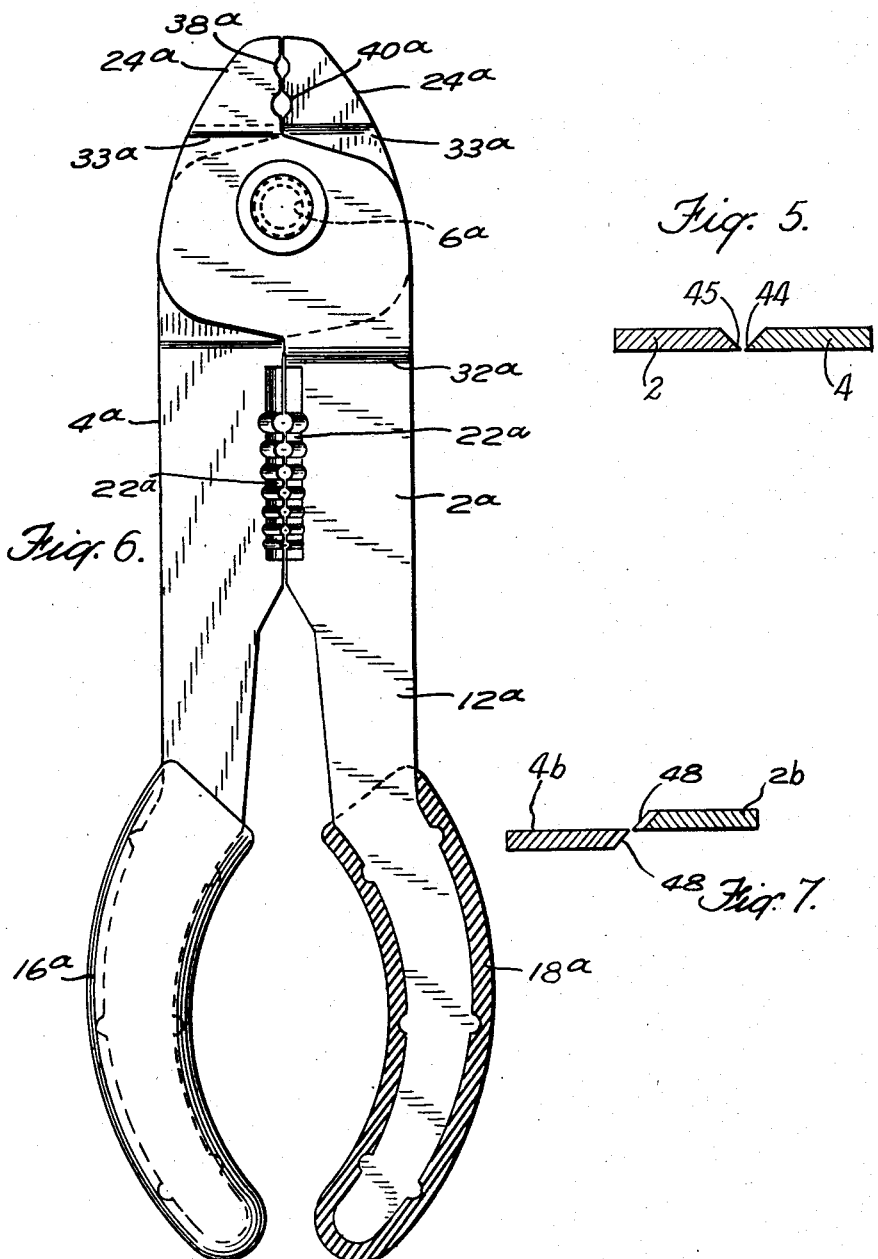
INVENTOR
LEMON B. PAULES Patented Feb. 9, 1954

2,668,464

UNITED STATES PATENT OFFICE 2,668,464

WIRE CUTTING AND STRIPPING TOOL

Lemon B. Paules, Harrisburg, Pa., assignor to Aircraft-Marine Products Inc., Harrisburg, Pa., a corporation of New Jersey Original application July 28, 1945, Serial No. 607,573. Divided and this application August 2, 1949, Serial No. 108,157

5 Claims. (Cl. 81—9.5)

This invention relates to wire cutting and stripping tools of the pliers type, and particularly to such tools adapted to prepare insulated wire for crimping or otherwise applying electrical terminals thereon. The present application is a division of my application Serial No. 607,573, filed July 28, 1945, now abandoned.

An essential to the best crimped connections with insulated stranded wire is a proper stripping of the insulation from the end of the wire which makes contact in the connector. If by careless stripping a few strands of the wire are cut or broken, the size of the wire is effectively changed and consequently it will no longer have the proper relation to the carefully controlled connector size, and the exactly determined action of the crimping dies will no longer suffice to forge the wire and connector together into a perfect electrical and mechanical connection. Accordingly, it is an object of the invention to provide stripping means for properly stripping wire of the sizes for which the dies of the tool are designed.

It is also an object to provide means for guiding the operator in adjusting the cooperating jaws of the wire stripper for proper spacing of the jaws during the stripping motion.

Another object of the invention is to provide means for protecting the cutting edges of such tools from accidental applications of excessive force.

Other objects and important features of the invention to which reference has not herein above specifically been directed will appear hereinafter when the following description and claims are considered in connection with the accompanying drawings, in which Figure 1 is a plan view of a combination tool embodying the invention, looking at it from one side, with the jaws of the tool in their closed relations and with the handle grip on one handle;

Figure 2 is plan view, partially broken away, looking at the tool from the other side, with the jaws in their closed relations;

Figure 3 is a perspective detail showing the wire stripping or insulation stripping action of the tool;

Figure 4 is a view in cross section taken on line 4—4 of Figure 2;

Figure 5 is a view in cross section taken on line 5—5 of Figure 2;

Figure 6 is a view similar to Figure 1 but showing a modified embodiment of the invention; and Figure 7 is a cross sectional view similar to Figure 4 but showing a modification in which the handle portions are not substantially offset from the portions adjacent the pivot.

The illustrative embodiment of the invention is, as above suggested, a combination tool of the pliers type and is intended for service under field conditions in installing electric wiring and particularly wiring having the conductor ends provided with terminal fittings for quick attachment to terminal studs or posts or to other conductors. The tool illustrated, as will appear more fully hereinafter, is designed to perform six interrelated functions in that it provides a wire cutter to cut the end on which a terminal is to be applied, a gage for determining the length of conductor to be stripped, a wire gage, a gage for selection of the correct stud hole of the terminal to be used therewith, a wire stripper and a crimping tool adapted to crimp terminal ferrules of different sizes to stripped conductor ends to which the respective ferrule sizes are correctly related.

As shown herein, the combination tool of the present invention is of the pliers type and comprises two crossed levers 2 and 4 of approximately identical contour, these levers being secured together on a common pivot comprising a hardened pivot tube 6 having a rivet 8 passing through it and a washer 10 fitted to the rivet at each end and over the end of tube 6. The end of the rivet is spread to secure the washers 10 in exact spaced relation and thereby to secure the levers 2 and 4 in permanent pivotal relation to each other.

As shown in the drawings, the levers 2 and 4 are stamped from sheet steel, or other suitable alloy, of tool quality, of sufficient thickness to resist easy bending transverse to the plane thereof and of sufficient width in the plane of the sheet to provide the desired strength to resist any strains to which the tool may be subjected in use.

As shown particularly in Figures 1 and 2, the levers 2 and 4 have handle extensions 12 over which insulating sheaths 16 and 18 of identical shape and construction may be fitted and permanently secured thereon by cementing together and by insulating hollow rivets 20 passing through holes in the insulating sheaths 16 and 18, which register with holes in and near the outer ends of the handles 12 and 14. The insulating sheaths 16 and 18 may be formed of any suitable insulating plastic, such as cellulose acetate, and the hollow rivets 20 may be formed of some suitable material such as vulcanized fiber.

As herein shown, each of the handle levers 2 and 4 is provided with three jaws 22, 24 and 26. The jaw 22 of each lever is formed between the pivot 8 and the handle extension 12 thereof and extends inwardly from the handle part thereof to insure spacing of the handles in the closed condition of the jaws. As further shown in the drawings, each lever has a lateral offset 28 overlapping the corresponding offset 28 of the other lever in the area around said pivot. The jaws 24 and 26 are formed on portions which are offset back into the same plane as the handles 12. The jaws 24, as shown in Figures 1 and 2, are preferably substantially radial with respect to the pivot 8. The jaws 26, like the jaws 24, are also preferably radial with respect to the pivot 8.

As will be seen from the drawings, the jaw 24 of one lever cooperates with the jaw 26 of the other lever when the tool is in its assembled condition; also the jaw 22 of each lever cooperates with the corresponding jaw 22 of the other lever. To bring these jaws into opposed relation to each other the material of the tool is offset in the area 28 from the plane of the other parts as shown, each substantially one-half the thickness of the sheet steel, thus permitting the jaws to be directly opposed to each other, this offset being effected substantially along the lines 32, 34 and 36 in each lever.

In the illustrative embodiment of the invention, the cooperating jaws 24 and 26 of the two levers 2 and 4 are provided with crimping dies. In the embodiment shown the jaws 24' of the lever 2 and 26 of lever 4 are provided with two crimping dies for terminal ferrules of different sizes clearly marked on the jaws, and the jaws 26' of the lever 2 and 24 of the lever 4 are provided with cooperating crimping dies of larger size also indicated on the jaw.

The jaws 22, hereinabove referred to, are constructed to perform a plurality of functions. As shown in Figures 1 and 2, those parts 44 and 45 of the jaws 22, which are near the offset lines 32 and therefore near the pivots 8 so that relatively great leverage is exerted upon them, serve as wire cutters. These opposed parts are bevelled, as shown in Figures 1 and 5, to sharp cutting edges in the plane of one of the jaw surfaces.

Radially outward from the wire cutter portions 44 and 45 the jaws 22 are bevelled to sharp cutting edges flush with the side thereof; and just beyond these sharp edges at the end remote from the pivot 8 stops 46 are provided. Between these stops and the wire cutter 44 and 45 each jaw is recessed at its edge for a double purpose. Each recess 48 constitutes one-half of a wire gage opening. These openings, as shown on the illustrative embodiment of the invention, are varied in sizes to gage wire sizes suitable for connection to ferrules by crimping in dies 38, 40 and 42. These are from 10 to 22 in the commercial A. W. G. scale and from ½ to 9 in Navy shipboard sizes.

A second pair of stop portions 47 are provided between the pivot 8 and the wire cutters 44. The stops 47 meet to limit pivotal movement while the surfaces of stops 46 are spaced a few thousandths of an inch. The handles 12 and jaws 22 are designed to yield resiliently under a normal human grip sufficiently to close this gap and brings stops 46 together.

Not only are the edges of the jaws between the successive gage openings 48 bevelled to sharpness but the semicircular edges of the openings themselves are bevelled to sharpness. The corners of each opening, however, are rounded off and slightly dulled to avoid nicking the wire and clipping of strands which may have escaped from the true circle.

In the manufacture of such a tool, identical blanks are stamped out of sheet steel and each is given the offsets described. Up to this point both parts 2 and 4 are identical and do not require separate handling. The jaws are then bevelled and the cutter-gage openings 48 formed, e. g. by grinding. The die faces 38, 40 and 42 are then formed advantageously by hobbing, the parts heat treated and then riveted together and the handle grips applied. Such stampings can be formed to very exact dimensions with close tolerances whereas the forgings heretofore used for such tools cannot be held to close tolerances and must therefore be machined or ground after forging.

Figure 6 shows a modified head form suitable where only one or two ferrule sizes must be crimped with the same tool. The corresponding parts on this tool are marked with corresponding reference numbers and further description will therefore be unnecessary. In this case however, only one pair of crimping jaws 24a are used and therefore only one offset 33a is required beyond the pivot axle 6a.

When a wire is to be applied to a connector, it may first be cut to the desired length by the cutter jaws 44 and 45. The conductor size is then measured by gaging in the holes 48 with the jaws 22 closed together. The wire is then stripped near its end, that is, has its insulation removed from a short portion of the conductor part thereof to which a terminal ferrule is to be crimped. To this end, the length of the part of the conductor to be stripped is determined by means of a gage marked 50, located on the face of the lever 2 which is exposed in Figure 2. The operator merely projects the end of the insulated wire over the outer edge of the lever 2 until the end coincides with the gage mark 50. If he is holding the wire with his left hand he may then place his left thumb nail on that part of the wire which coincides with the edge of the lever 2, to mark the portion to be stripped. The next step is to insert the wire in the recesses or openings 48 marked with the gage marking the wire to be stripped bringing his thumb nail down against the flat surface beside the gage opening. The operator then, with his right hand, closes the tool which will effect a partial cutting of the insulation, whereupon the operator gives the wire a quarter turn and closes the tool again, which completes the cutting of the insulation. Since the final closing flexes the handle and jaw portions, they spring back slightly when released; the wire may then be stripped by merely pulling it through the opening while the jaws are held in their closed condition.

Other gaging means may be provided, e. g. the circles 51 and 51' (Figure 1) for gaging stud openings in the tongues of electrical terminals. The appropriate stud or the appropriate terminal opening may be gaged on the combination tool by causing it to register with the circles 51, 51', etc. marked with the appropriate stud sizes, as shown thereon.

As shown in Figure 7 the gage and wire cutter portions 44 and 48 can be bevelled from opposite sides, in which case the handle portions 22 need not be offset from one another but may have their opposite sides lying in substantially the same plane, as is the case in the overlapping portions near the pivot 6. With this arrangement the circle of the gage is not quite as evident as when the abutting portions 22 are flush, but the sloping side facilitates the guiding of a wire into the circular opening while the adjacent flush side permits clear view of the end of the wire as it reaches the gaging position.

Although I have shown tools combining crimping jaws, wire stripping jaws, wire cutters, etc., these may if desired also be used separately by omitting the other jaw members or the portions of the jaws which serve the undesired functions.

What is claimed is:

1. A cutting tool which comprises pivotally connected operating means, cooperating cutting members, at least one of which is provided with a sharp edge, connected to said levers for movement therewith into edge abutting relation to the cooperating cutting member, stop means between said cutting members and the pivotal connection of said operating means to limit inertial and accidental movements of said cutting members short of said abutting relation, but at least one of said operating means being resiliently yieldable under full operating force to bring said cutting members into edge-cutting relation.

2. A cutting tool which comprises pivotally connected operating means having handles and jaws integrally formed thereon, at least one of said jaws having a sharp cutting edge adapted to come into abutting relation with the other jaw, stops for said operating means beyond said jaws in a direction opposite from the direction of said handles and adapted to initially limit the closing of the jaws while said cutting edge is still a short distance from the abutting part of the opposed jaw, said operating means being sufficiently resilient to allow full closing of said jaw into said edge abutting relation by the force of a normal human grip on said handles, and an additional stop beyond the cutting edge in the direction of said handles adapted to limit such further closing movement at the precise point when said sharp edge is in said abutting relation.

3. A cutting tool which comprises pivotally connected operating means having handles and jaws integrally formed thereon, at least one of said jaws having a sharp cutting edge adapted to come into abutting relation with the other jaw, stops for said operating means beyond said jaws in a direction opposite from the direction of said handles and adapted to initially limit the closing of the jaws while said cutting edge is still a short distance from the abutting part of the opposed jaw, and said operating means being sufficiently resilient to allow full closing of said jaws into said edge abutting relation by the force of a normal human grip on said handles.

4. A tool comprising a pair of levers having a common pivot and each comprising a handle extension and a jaw adapted to cooperate with a like jaw of the other lever, each jaw being located between said pivot and said handle extension and being provided with at least one wire gage recess cooperating with a corresponding recess of the other jaw to complete a wire gage opening, each jaw being bevelled to a sharp edge around and at either side of said recess to constitute an insulation cutter and stripper for insulated wires of the appropriate gage, and stop portions on the edges of said jaws beyond said wire gage recesses in a direction opposite to the direction of said handle extensions, said stop portions being adapted to abut slightly before the final closing together of said sharp edges, said jaws being capable of resilient yielding under the force of a normal human grip on said handle extensions to permit substantially full closing of said sharp edges.

5. A tool comprising a pair of levers having a common pivot and each comprising a handle extension and a jaw adapted to cooperate with a like jaw of the other lever, each jaw being located between said pivot and said handle extension and being provided with at least one wire gage recess cooperating with a corresponding recess of the other jaw to complete a wire gage opening, each jaw being bevelled to a sharp edge around and at either side of said recess to constitute an insulation cutter and stripper for insulated wires of the appropriate gage, stop portions on the edges of said jaws beyond said wire gage recesses in a direction opposite to the direction of said handle extensions, said stop portions being adapted to abut slightly before the final closing together of said sharp edges, said jaws being capable of resilient yielding under the force of a normal human grip on said handle extensions to permit substantially full closing of said sharp edges, and additional stop portions on the edges of said jaws beyond said wire gage recesses in the direction of said handle extensions, said additional stop portions being adapted to limit such yielding precisely when said sharp edges come into contact.

LEMON B. PAULES.

References Cited in the file of this patent

UNITED STATES PATENTS

| Number | Name | Date |
| --- | --- | --- |
| 529,488 | Gile | Nov. 20, 1894 |
| 776,879 | Wolfe | Dec. 6, 1904 |
| 838,920 | Varnedoe | Dec. 18, 1906 |
| 1,349,563 | Day | Aug. 17, 1920 |
| 1,388,398 | Adams | Aug. 23, 1921 |
| 1,456,928 | Lake | May 29, 1923 |
| 1,814,589 | Endsley | July 14, 1931 |
| 2,386,327 | Martin | Oct. 9, 1945 |